T. E. MURRAY.
VEHICLE WHEEL.
APPLICATION FILED FEB. 1, 1915.
1,149,593.
Patented Aug. 10, 1915.
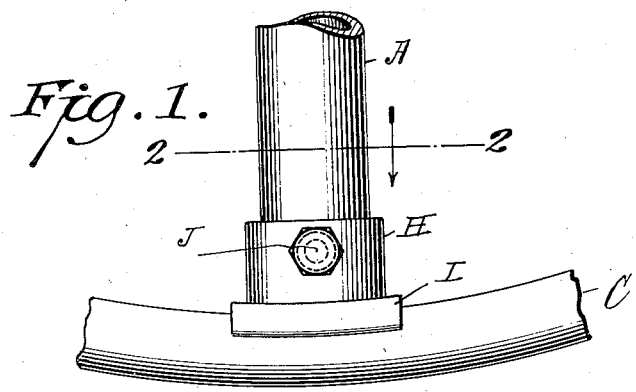
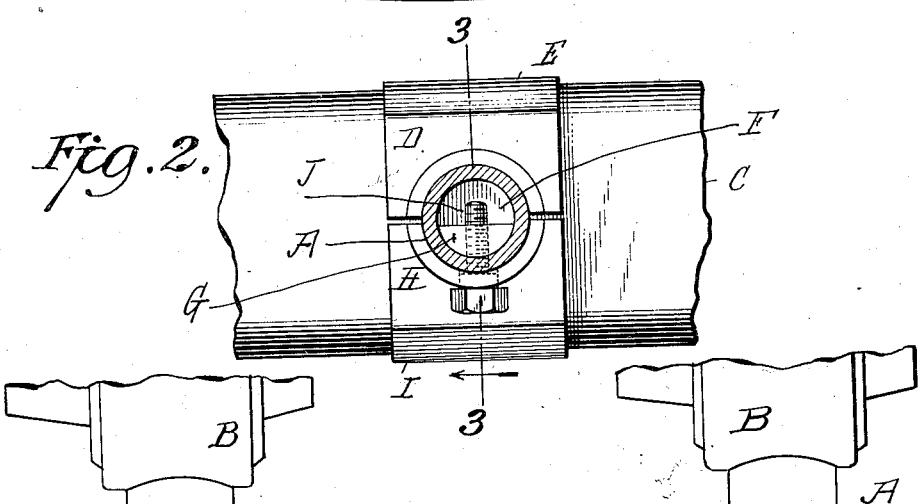
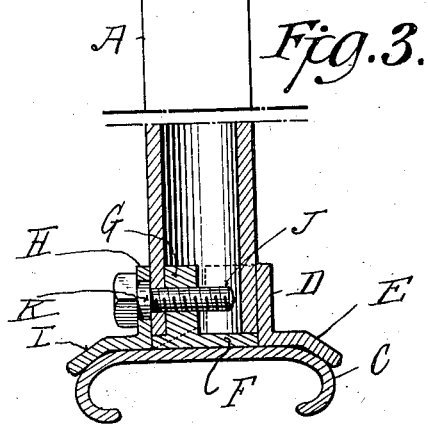
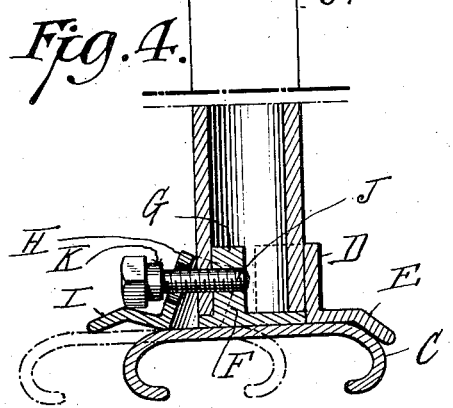
Witnesses:
Inventor
Thomas E. Murray
By his Attorney

UNITED STATES PATENT OFFICE.

THOMAS E. MURRAY, OF NEW YORK, N. Y.

VEHICLE-WHEEL.

1,149,593.  Specification of Letters Patent.  Patented Aug. 10, 1915.

Application filed February 1, 1915. Serial No. 5,579.

*To all whom it may concern:*

Be it known that I, THOMAS E. MURRAY, a citizen of the United States, residing at New York, in the county of New York and State of New York, have invented a certain new and useful Improvement in Vehicle-Wheels, of which the following is a specification.

The invention relates to vehicle wheels, and has for its object to provide a firm fastening for the spokes to the rim and to render the rim easily mountable upon and demountable from the ends of said spokes. The construction is such that it is necessary only to loosen a fastening screw bolt at the end of each spoke to enable the rim to be removed laterally from the spoke ends or in the same direction, applied thereto. The invention consists in means substantially as hereinafter set forth for detachably connecting said rim to said spoke ends.

In the accompanying drawings—Figure 1 is an elevation of my device. Fig. 2 is a section on the line 2, 2 of Fig. 1. Fig. 3 is a section on the line 3, 3 of Fig. 2, showing the device in closed position, and Fig. 4 is a similar section, showing the device in open position.

Similar letters of reference indicate like parts.

A is a tubular spoke of metal, secured to the hub B. C is the rim formed in the usual way to receive a tire. To one side of the spoke is welded an angle piece D having a flange E which bears upon the inner periphery of said rim.

F is a metal disk having a projection G which extends into the open outer end of the spoke. To the side of the spoke opposite the side to which the angle piece D is welded is applied a loose curved angle piece H, also having a locking flange I bearing on the inner periphery of the rim. The projection G has a threaded opening to receive the headed screw bolt J. On said bolt is formed an enlargement K which is received in an opening of suitable size in the angle piece H.

In securing together the spokes and the rim, the screw bolt J is first partly withdrawn, so that the enlarged opening in the angle piece H is received upon the adjacent portion of the bolt which is of smaller diameter. The angle piece H can then be swung outwardly, as shown in Fig. 4, thus lifting the locking flange I, so that the rim may be moved laterally from the position shown in dotted lines in Fig. 4 to the position shown in full lines, until its edge meets the flange E on angle piece D and its middle portion bears upon disk F. The bolt is then set up, as shown in Fig. 3, clamping the spoke A, the angle piece H and the projection G tightly together, the rim then being engaged between the flanges E and I. The disk F may be welded to the end of the spoke or may be separate therefrom. By reason of this construction, the rim may be applied to or removed from the outer ends of the spokes after their inner ends have been attached to the hub. To put it on, it is only necessary to loosen the bolts and swing up the flanges I, when the rim may be carried laterally inward to its seat, as already described, the bolts being afterward set up to retain it in place. To remove the rim, the bolts are loosened, as before, and the rim is drawn laterally outward from the spokes. This enables the rim—together with its tire, if one be in place—to be taken off the wheel or applied thereto with great facility, and so provides for quick substitution in case of injury or wear.

I claim:

1. A vehicle wheel, comprising a rim, a tubular spoke, a clamping member homogeneously united to said spoke and adapted to engage one side of said rim, a separate and movable clamping member on the opposite side of said spoke and adapted to engage the other side of said rim, a concave and substantially semi-circular flange on said movable member receiving said spoke, and means for detachably securing said flange to the wall of said spoke.

2. A vehicle wheel, comprising a rim, spokes, and, on each spoke, a fixed flange, and a separate locking member, the said member and flange receiving the rim between them, a disk interposed between the end of said spoke and said rim and having a projection entering said spoke, and a screw bolt extending through said locking member and the wall of said spoke and engaging said projection.

3. A device for fastening a tubular spoke to a wheel rim, comprising a spoke, an angle piece secured to said spoke at the outer end thereof and having a flange, a disk having a projection entering the open outer end of said spoke, a loose angle piece constructed to fit upon the outer periphery of said spoke and having a flange oppositely disposed to said first-named flange, the said flanges being adapted to receive a rim between them, and a screw bolt having an enlargement received in an opening in said last-named angle piece and having its threaded portion passing through the wall of said spoke and engaging in a threaded opening in said projection.

In testimony whereof I have affixed my signature in presence of two witnesses.

THOMAS E. MURRAY.

Witnesses:
GERTRUDE T. PORTER,
MAY T. McGARRY.